(12) United States Patent
Thomas et al.

(10) Patent No.: US 11,165,493 B2
(45) Date of Patent: Nov. 2, 2021

(54) INTELLIGENT NODE FOR EXTENDING A TELECOMMUNICATIONS NETWORK

(71) Applicant: networxINmotion GmbH i.G, Haar Munich (DE)

(72) Inventors: Laurent Thomas, Palaiseau (FR); Christian Pfalz, Munich (DE)

(73) Assignee: networxINmotion GmbH i.G, Munich (DE)

( * ) Notice: Subject to any disclaimer, the term of this patent is extended or adjusted under 35 U.S.C. 154(b) by 71 days.

(21) Appl. No.: 16/484,542

(22) PCT Filed: Feb. 13, 2018

(86) PCT No.: PCT/EP2018/053509
§ 371 (c)(1),
(2) Date: Aug. 8, 2019

(87) PCT Pub. No.: WO2018/146327
PCT Pub. Date: Aug. 16, 2018

(65) Prior Publication Data
US 2019/0372661 A1    Dec. 5, 2019

(30) Foreign Application Priority Data
Feb. 13, 2017   (LU) ........................................ 100072

(51) Int. Cl.
*H04B 7/26*   (2006.01)
*H04W 76/00*  (2018.01)
(Continued)

(52) U.S. Cl.
CPC ........... *H04B 7/2606* (2013.01); *G06F 16/29* (2019.01); *H04L 5/14* (2013.01); *H04W 12/037* (2021.01);
(Continued)

(58) Field of Classification Search
None
See application file for complete search history.

(56) References Cited

U.S. PATENT DOCUMENTS

2005/0222948 A1* 10/2005 Sato ...................... H04M 15/82
                                                        705/40
2015/0365155 A1   12/2015 Sundar
(Continued)

FOREIGN PATENT DOCUMENTS

WO        9315565 A1     5/1993
WO     2012/142339 A1   10/2012

OTHER PUBLICATIONS

Xiaobing Leng et al. :"A frame structure for mobile multi-hop relay with different carrier frequencies", Internet Citation, Nov. 11, 2005, p. 5, XP003024474.

*Primary Examiner* — Scott M Sciacca
(74) *Attorney, Agent, or Firm* — 24IP Law Group USA, PLLC; Timothy Dewitt

(57) ABSTRACT

The present invention proposes an intelligent node for extending a 3GPP telecommunications network comprising a plurality of legacy base stations and a plurality of end user equipment, a telecommunications network comprising such an intelligent node and a method for expanding a 3GPP telecommunication network. The intelligent node is adapted to connect to one of the legacy base stations and act as an end user equipment. The intelligent node is further adapted to act as a relay or base station to expand said telecommunication network.

15 Claims, 4 Drawing Sheets

(51) Int. Cl.
  *H04W 12/02* (2009.01)
  *H04W 84/02* (2009.01)
  *H04W 88/04* (2009.01)
  *H04W 88/08* (2009.01)
  *H04W 76/10* (2018.01)
  *G06F 16/29* (2019.01)
  *H04L 5/14* (2006.01)
  *H04W 12/037* (2021.01)
  *H04W 84/04* (2009.01)
  *H04W 84/18* (2009.01)

(52) U.S. Cl.
  CPC .......... *H04W 76/10* (2018.02); *H04W 84/042* (2013.01); *H04W 84/18* (2013.01); *H04W 88/08* (2013.01)

(56) References Cited

U.S. PATENT DOCUMENTS

| | | | | |
|---|---|---|---|---|
| 2016/0127897 A1* | 5/2016 | Lee | ........................ | H04W 12/06 |
| | | | | 713/176 |
| 2016/0323811 A1* | 11/2016 | Lepp | ..................... | H04W 48/12 |
| 2016/0338095 A1* | 11/2016 | Faurie | ............... | H04W 28/0278 |
| 2017/0244468 A1* | 8/2017 | Zhao | ..................... | H04W 48/16 |
| 2018/0019904 A1* | 1/2018 | Lee | .................... | H04W 72/0453 |
| 2018/0084442 A1* | 3/2018 | Lee | ........................ | H04L 5/0048 |
| 2018/0227282 A1* | 8/2018 | Lee | ........................ | H04L 63/061 |
| 2019/0320443 A1* | 10/2019 | Wang | .................... | H04W 88/04 |

\* cited by examiner

INTELLIGENT NODE FOR EXTENDING A TELECOMMUNICATIONS NETWORK

BACKGROUND OF THE INVENTION

Field of the Invention

The present invention relates to a telecommunication system for relaying telecommunications signals.

Brief Description of the Related Art

A use of mobile communication networks has increased over the last decades and standards have been implemented to allow real time services.

3GPP standards for 2G/3G/4G communications networks use fixed radio resources allocation in a fixed base stations deployment. An operator must compute a network deployment map and adjust an antenna emission diagram of each base station by tuning an emitted frequency and power. The 3GPP standard implementation is limited, however, to fixed base stations.

Existing cellular networks offer communication between base stations (BS) and end user terminals (UE), using fixed patterns: a first pattern is frequency duplex division FDD) in which the UE emits on a set of frequency channels while the BS uses another set on frequency channels. A second pattern is time duplex division (TDD) in which the frequency is the same for UE and BS, nevertheless the allocation is fixed and permanent for a long time (typical: 15 years): all BS emit all together for a given dedicated periodic time (typical: milliseconds) while all UE emit during the remaining periodic time. These frequency channels and related geographic area are allocated to an operator for a long while (typically 15 years).

The 3GPP networks mandatory planning and permanent beacon emission matches the initial deployment of this technology. The operator receives frequency band allocation. He uses this allocation to deploy heavy base stations to serve simple terminals and to demonstrate to the government it covers the allocated piece of land. This coverage is well defined and constant over the time (at least several months): the permanent beacon received by the terminals is shown as the 'signal strength bars" on the terminal. But it doesn't provide any information on the actual capacity to transmit data: the base station can be congested, the backhaul link to internet defective, the configuration not well done (example: the beacon emission power is not well balanced with the terminal power and/or base station reception). The 3GPP standard terminals are designed to be minimal: they don't have to memorize any network information: all needed information is permanently broadcasted.

To increase capacity of a 3GPP communications network, relays have been defined which are able to operate within the deployed network. To increase further the network capacity, a direct terminal to terminal communication has been developed, called Proximity-based services (ProSe), defined in the 3GPP TS 23.303, in order to enable direct communication between mobile stations or even between mobile station and relays. The services include an emergency call service coming from a second mobile out of coverage. However, even with ProSe, direct communication between two terminals remains impossible if the two terminals strictly receive only on downlink channel (FDD) or downlink time frame (TDD), so 3GPP decided in specific ProSe cases that terminals can receive on uplink (but not emit on downlink). Therefore, ProSe is only an emergency service on the global network static design, computed in back offices, then deployed as fixed base stations.

More recently, after relays and ProSe, another third 3GPP approach called V2x (Vehicle-to-everything) targets the use of the 3GPP standard in vehicle communication for security and driving assistance instead of the other standardization initiative such ITS (ETSI intelligent transport system) or IEEE 802.11p. The third 3GPP approach focused on local information transmission such as a crossroads warning between incoming cars.

The 3GPP defines numerous channels: permanent time periods combined with permanent RF modulation schemes to separate base station signalling, terminal signalling, base station end user data transmission (and reciprocal terminal to network user data transmission). The 3GPP minimizes the "random access" to a single uplink periodic time slot and frequency band to start-up communications. The only existing way to start service is the terminal receives and decodes the permanent downlink beacon, reads the network configuration in this beacon broadcast and then uses the defined random access channel to initiate the "link". Then, everything is controlled by the base station that allocate resources for uplink and downlink transmissions.

Literature offer ad-Hoc networks (or mesh networks) as small wireless networks with no central control. It has been implemented in standards such as 802.11s to make wireless LAN (local area networks), but these networks capacity decrease with the size and it has never been designed to be a public network with 100s millions of subscribers.

In view of the above, there is a need for an extension of the existing network standards.

SUMMARY OF THE INVENTION

The present invention teaches an intelligent node for extending a telecommunications network comprising a plurality of legacy base stations and a plurality of end user equipment, wherein the intelligent node is adapted to connect to one of the legacy base stations and act as an end user equipment, and wherein the intelligent node is adapted to act as a relay or base station to expand said telecommunication system.

The present invention therefore proposes an extension of 3GPP standards to create a global cooperation of all end-user terminals, using the operator allocated all frequency bands, with no fixed separation such as channels or dedicated uplink and downlink resources and to use any other allowed communication resources that do not belong exclusively to this operator (IMS band, LiFi, car radars, . . . ) to increase the total network coverage and throughput.

The intelligent node may be adapted to emit a first beacon corresponding to a regular 3GPP beacon when said intelligent node needs to offer connectivity to a legacy end user equipment and adapted to emit and receive on allowed radio resources. a second beacon for empowered nodes. With other words, the present invention proposes that the intelligent node be adapted to shut down the 3GPP nodes permanent beacon emission and replace it by a second beacon. Permanent beacons remain necessary to serve legacy terminals, not empowered by this invention.

Preferably, the second beacon is a short and discontinuous emission, and the second beacon emission pattern is a known pseudo random scheme. Hence, listeners can forecast when the next emission is taking place.

In an aspect of the invention, the intelligent node is adapted to emit a blind connection request, to either a set of nodes or simply to everybody that can listen said connection request regardless of previous reception of the second beacon.

The intelligent node is adapted to decode a second beacon emitted by another intelligent node, in order to find out a global unique number of the node, and wherein the intelligent node (20) has a memory to store node number of other node and maintains a fuzzy neighbour nodes map as routing information, and is adapted to estimate real-time location, time, antennas in one node, frequencies using said map.

In one aspect of the invention, the intelligent node is adapted to establish access packets to request communication regardless observed beacons.

In yet another aspect of the invention, the intelligent node may use frequency channels in particular the two sub frequency channels of FDD scheme or the two time-slots of uplink and downlink of TDD scheme, where and when it is needed, regardless the fixed FDD or TDD scheme or any other fixed permanent organisation.

For increased security, the intelligent node may have a network key to prove that the intelligent node belongs to a home network identified by the network key, wherein the intelligent node may separate signalling data and end user data cryptography using different security keys.

The present invention further teaches a telecommunications network comprising a plurality of legacy base stations and at least one intelligent node according to the above aspects.

In one embodiment, the telecommunication network establishes a multi hop routing of data based on routing information collected by the second beacons and access requests answers.

For security, the telecommunications network may further comprise at least one network key for the intelligent node, the network key being a node ID unique key to prove said intelligent node's identity to the other network elements.

In an aspect of the invention, the telecommunications network comprises a border node, the border node adapted to act as a fixed internet user for each user of the said communication system, wherein the border node authorizes and protects data packets to each subscriber of the said communication network. The border node may comprise a central database adapted to process historical data to create a map of resources that appear permanently or periodically, in particular the central database providing information to further intelligent nodes belonging to said telecommunication network to improve the probability of success of each transmission and minimize the interferences to legacy communication networks that share the same frequency bands.

In an aspect of the invention, the telecommunication network comprises an automatic computation of network coverage gaps that send incentives to customers to place their intelligent nodes where it fills these gaps.

The present invention further teaches a method of extending a 3GPP telecommunication network comprising a plurality of legacy base stations and a plurality of end user equipment with an intelligent node, comprising the step of acting, by the intelligent node connected to one of the legacy base stations, as an end user equipment, and the step of acting as a base station, by the intelligent node, to expand said telecommunication network.

The method in one aspect of the invention comprises emitting, by the intelligent node a first beacon corresponding to a regular 3GPP beacon when said intelligent node needs to offer connectivity to a legacy end user equipment, and emitting a second beacon for empowered nodes, to expand said telecommunications network. The second beacon is preferably a short and discontinuous emission, in particular the second beacon has an emission pattern as a known pseudo random scheme, so the listeners can forecast when will be the next emission.

Hence the present invention proposes intelligent nodes implementing swarm intelligence principles, using the connectivity they can find: the operator licensed frequency channels, regulated band such IMS or device specific such as anti-collision radar signal modulation.

In cases where it is better than reaching directly a base station connected to the global internet, multi-hop packet forwarding is implemented between the intelligent nodes to transmit data to the operator gates to the global internet. Ultimately, for public safety use cases, if the operator network is not available, the intelligent nodes forming a telecommunication system can behave like a secured autonomous ad hoc network to provide communication capacity.

As an example, the intelligent node can connect to a WiFi domestic access, using Facebook based shared WiFi keys with "friends", or a more global service such as www.fon.com service. The intelligent node therefore can share discovered telecom capacity with other intelligent nodes and to implement strong authentication. The strong authentication enables secured service and routes incoming traffic to the user (like do SMS service).

BRIEF DESCRIPTION OF THE FIGURES

The invention will now be described with references to the figures which show.

DETAILED DESCRIPTION

The invention will now be described on the basis of the drawings. It will be understood that the embodiments and aspects of the invention described herein are only examples and do not limit the protective scope of the claims in any way. The invention is defined by the claims and their equivalents. It will be also understood that features of one aspect can be combined with features of a different aspect.

Figure 1:
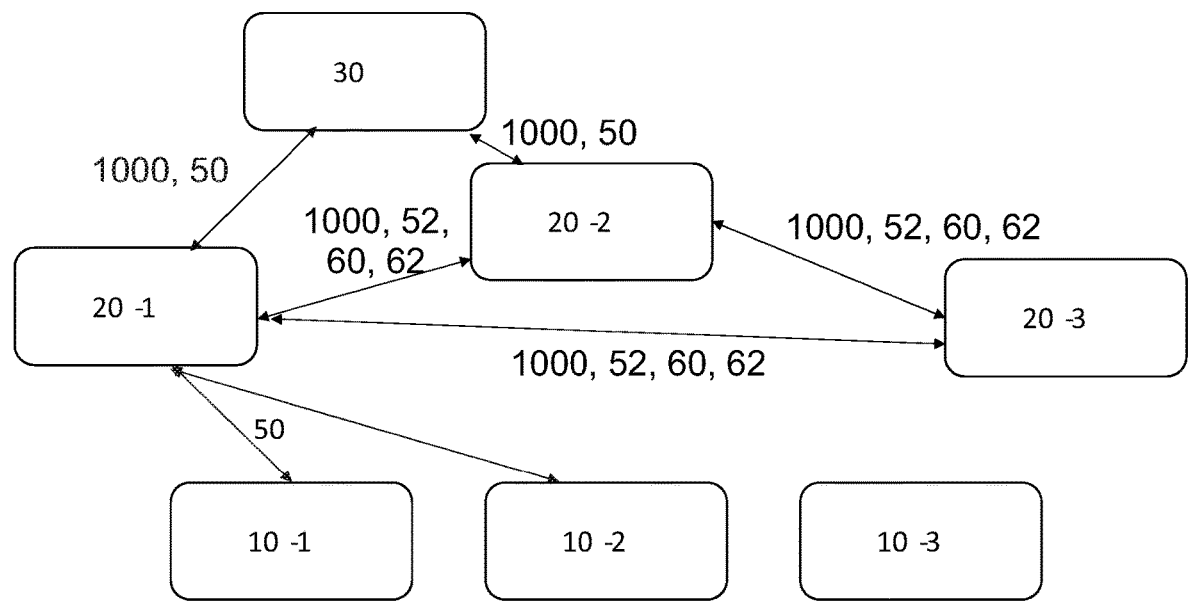
FIG. 1 shows an overview of a network including a node in one aspect of the invention.

FIG. 1 shows an overview of a network 1 in one aspect of the invention. The network 1 comprises a plurality of pure end user equipment 10-1, 10-2, 10-3, served by a plurality of end user intelligent nodes 20-1, 20-2, 20-n. All of them are connectable to a main communications network 30.

End user equipment (node 10) can be regular 3GPP terminals, as well as any other radio terminals like wireless sensors that can benefit of a nearby intelligent node 20 to reduce the required energy per bit transported towards the first data offload sink.

As will be explained in the following, for smooth evolution of existing 3GPP networks, the intelligent nodes 20-1, 20-2, ..., 20-*n* (referred to intelligent node 20) are configured to behave both as an evolved node B (eNB) distributing intelligence among the base stations and as an end user equipment. With other words, the intelligent nodes 20-1, 20-2, ..., 20-*n* are configured to be seen as an eNB by legacy 3GPP end user equipment and as an end user equipment by legacy eNB, thereby creating a multi-hop system to enhance the regular user services.

The intelligent nodes 20 are adapted to scan signal 1000 for various possible technologies, such as 3GPP, WiFi, Bluetooth and more recent technologies such communications via Light Fidelity (Li-Fi), which is a bidirectional, high-speed and fully networked wireless communication technology like Wi-Fi, or information encoded into car radar emissions (as Li-Fi encode information in the light emitted primarily to shine). This is a key feature to enable low power transmission data transfer from e.g. sensors in smart city use cases.

The intelligent nodes 20 are adapted to share their knowledge with their neighbours. To do so the information can be stored in a database to make this possible links scanning faster and more accurate. The database is preferably a real-time database.

The intelligent nodes 20 implement a routing logics for the routing of packets: a node 20 routes an incoming initial packet from a new emitter on already available routes to/from this packet destination. With other words, the intelligent nodes 20 of the present invention are adapted to use all these connection possibilities as a unified service with full authentication and routing. This extension of cellular network coverage and throughput by relaying information in new node types, typically on board of moving vehicles, as explained in the following.

Existing 3GPP cellular networks offers communication through base stations that emit a permanent beacon to end user terminals. The UE must listen the BS beacon then decode the system information to later try a RF emission. This is the "Physical random access channel" of the BS.

The implementation of 3GPP standard requires that the beacon emitters (the base stations) are carefully positioned, their antenna orientation is defined with a high precision and to set RF power, frequency band parameters to provide continuous service while minimizing interferences. This existing system requires each customer terminal permanently receive a RF signal (beacon) from an operator base station. This beacon permanent reception can be seen on regular cell phones as the "signal bars" that everybody interprets as a future communication quality if he decides to use the network service. The communication is done only between these customer terminals and the operator owned base stations.

The 3GPP standard has strong limitations. Base stations need to be installed according to an off line computed plan to mitigate cell to cell interferences. In addition, many stations need to be deployed to provide service behind hills, buildings ... and to provide indoor service as walls decay the RF signal. Each base station requires to be powered 24/7 as it emits 24/7 RF power to be seen by end user equipment. Beyond the legacy model of terminal receiving a beacon, then connects to the base station, ProSe already created new ways to connect devices with two models: Model A: involves one UE announcing "I am here", Model B: involves one UE asking "who is there" and/or "are you there" to create connections. But even this ProSe model is limited to very specific use cases and all these mechanisms are to slow for very low latency communications.

Figure 2:
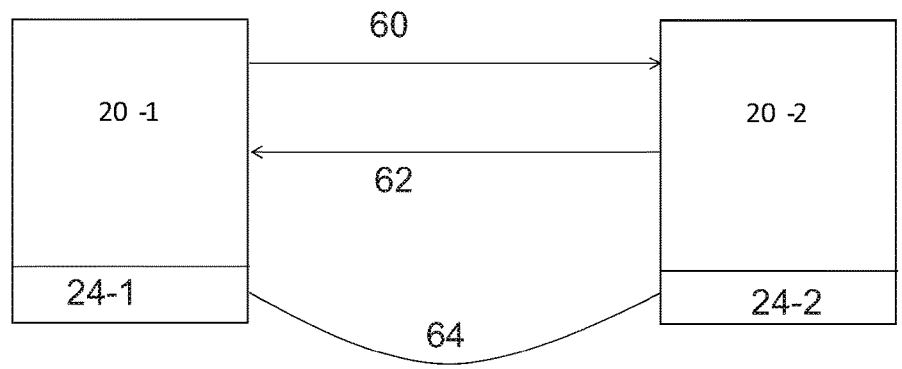
FIG. 2 shows an overview of intelligent nodes in another aspect of the invention.
Figure 3:
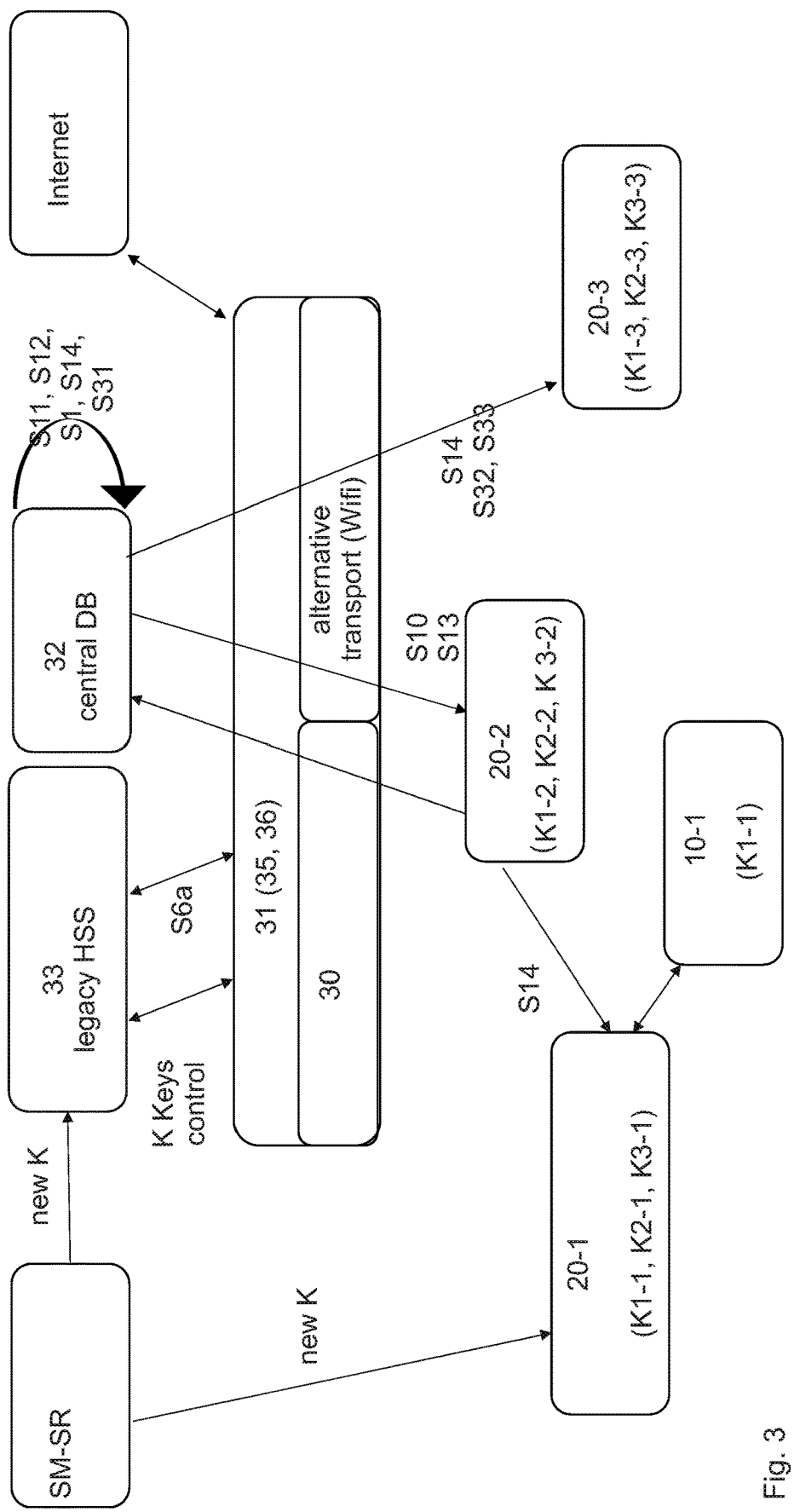
FIG. 3 shows an overview of a network including a node in one aspect of the invention.

In an aspect of the present invention described in reference with FIGS. 1, 2 and 3, the intelligent nodes 20 are adapted to emit a regular 3GPP beacon 50 when said intelligent nodes needs to offer connectivity to a legacy end user equipment 10-1. The intelligent nodes 20 are further adapted to emit discontinuous bursts 52 for empowered nodes. These bursts 52 can be considered as a second beacon.

The second beacon 52 doesn't necessarily use a 6 Resource blocks (frequency band resource) dedicated to the broadcasted beacon in 3GPP. It uses a predictable pseudo-random adaptive scheme in a way that allows un-planned deployment: if there is many of these stations overlapping (like many cars equipped with a node 20 in a public parking).

The second beacon 52 is a short and discontinuous emissions. The emissions follow a known pseudo random time interval between two emissions, so the listeners can forecast when will be the next emission. The emission is done only if the node cannot listen another node speaking at the same time (just before deciding to emit). The pseudo random scheme derives from a root number for this node (as the physical cell-id of present 3GPP standard).

When the listeners decode the second beacon 52, they can deduce a unique key as the global cell ID (the worldwide unique number of the node). The second beacon 52 does not contain all the "system information block" (SIB) of present 3GPP standard, but only a version number as an adapted signature (increasing at each update). If the node global cell id or the SIB version is not already known and the SIB information is needed, the beacon listener node engages a dedicated communication to retrieve the SIB data.

The intelligent node 20 have a memory which can remember the SIB of numerous nodes it meets and to download & store the permanent known nodes from the operator central storage: fixed base stations, known WiFi hot spots, . . . . To free the memory, the intelligent nodes 20 deletes data about nodes it doesn't reach for a long period, for example several days. Hence, contrarily to the 3GPP standard, in which a permanent beacon is emitted permanently and wherein the nodes listen continuously, the intelligent nodes 20 have a memory enabling us to store the adapted signature of neighbour nodes so that the intelligent nodes 20 do not need to listen continuously.

By these second beacon 52, the intelligent nodes can maintain a fuzzy neighbour nodes map and use this map to show end users the network communication possibility and to initiate dedicated communications when it is required. The node is adapted to estimate real-time location, time, antennas in one node, frequencies to provide extended communication between the BS and the UE.

It will be appreciated that the channel occupancy average must remain low enough to limit message collision/overlap even in critical situations such as a car parking with all cars equipped with a node. Hence, the pseudo random beacon frequency decreases with the number of neighbours the node can detect.

When a node 20 needs to establish a connection, the node is able to use this information to emit a connection request 60 (replaces the random-access message in 3GPP glossary) to either a set of nodes (a set of physical cell IDs) or simply to everybody that can listen said connection request (see FIG. 1, 2). Instead of the today 3GPP random channel access procedures, this connection request is a blind request which can be sent to quickly check out possible connectivity. The skilled person will understand that when a node needs to initiate a dedicated communication, it emits said random access message 60 but it doesn't require to be directed to a specific base station, neither in a previously signalled random access dedicated channel.

The intelligent node 20 are adapted to establish a random-access response packets 62. The random-access packets 62 can be in the same frequency band, so the beacon radio resources may act as both UE and eNB.

It will be appreciated that the intelligent nodes are adapted to respect the operator licensed frequency bands. When the intelligent nodes 20 emit in such licensed resource even in the new blind emission. The node 20 uses the operator licensed frequencies, as defined in the UICC (SIM) card, nevertheless it could be placed out of the operator allocated area (e.g. in a different country).

To limit possible RF emission out of the geographic area given to the operator, the node uses memorized network characteristics: Geolocalization of networks (GPS or similar points), known permanent nodes (operators fixed BS, WiFi known hot spots, . . . ), stored in an operator controlled memory (UICC/SIM card or non-customer accessible phone memory).

A node answer 62 to a random-access message 60 include information relating to a signal quality estimation, allowing the requester to compare several answers from several neighbours (FIG. 2). The node answer provides the global internet connectivity it can offer, i.e. from unlimited connectivity (the node has a high-speed optical fibre to internet) to no probable connectivity if it tries to relay the messages (the node cannot see any other node beacon for a while). The node answer provides also a willingness to serve the communication from equipment dependent values (example a parked car, running on battery would moderate its willingness to be involved).

The skilled person will appreciate that the node answer 62 to a random-access message 60 includes more information than the standard 3GPP answer. Instead of 3GPP algorithm for long range between a base station and a terminal, such as cooperated multi-point (CoMP), the intelligent node prefers to engage a couple of good quality (usually short range) set of communications links to a permanent global internet connected node, such as typically a legacy 3GPP eNB. The requester chooses a node and try to engage a dedicated channel. This can create a request of this node to reach a global internet connected node and so on.

The random-access message 60 can also be used to transmit data inside the message for typical applications such as short low latency messages (example: internet of things).

The intelligent node 20 uses frequency channels for short periods of time, where and when it is needed regardless the fixed FDD or TDD scheme or any fixed channel that dedicate a sub part of the global radio resource to a specific usage.

If the operator has enough frequency resources to mitigate interferences and if the communication density is low, as typically is deep rural network or for specific security usages, the Intelligent node offers to extend the network coverage while being fully compatible with legacy equipment. The intelligent node combines features of eNB and UE, so it does use all radio resources instead of being limited to emit on DL, receive on UL (FDD case) or respect fixed DL and UL time slots (TDD case). Using its both UE and eNB features, the Intelligent node can be a relay for the other intelligent nodes.

The intelligent nodes 20 are adapted to establish dedicated resources (dedicated channel) between each involved pair of intelligent nodes whenever a data to be sent exceeds a predetermined threshold. For example, the predetermined threshold may be a few hundred bytes of backlog, not transmitted in a few milliseconds.

When the backlog piece of data to send is large enough or continues to appear quickly from end user application, by pairs, two of the intelligent nodes are adapted to enter in close loop channel estimation using the measurements feedback and time reversal estimation of the received signal to improve the communication. If the intelligent nodes have several antennas (for MIMO, beamforming, time reversal emission, . . . ), the throughput in bits/(bandwidth*time*power) will increase a lot for the next packets. Nevertheless, all intelligent nodes could be moving and traffic need for node to node varies also quickly in that case. The connectivity map evolves very quickly because the channel coherency time decreases with the number of antennas used in MIMO transmission.

Each intelligent node 20 maintains its internal near real time map by the second beacons 52 in form of short information bursts instead of permanent emission of the first beacon 50 of the today 3GPP based systems. The intelligent nodes use internal algorithms to estimate relay intelligent nodes positions and RF communication path losses. The intelligent nodes are able to establish a common knowledge of their relative RF path losses (signal decay) and capabilities, including MIMO and antenna diversity capabilities that enhance the long term stored internal memory map.

During the communication, the involved intelligent nodes maintain closed loop to optimize the fast-changing parameters (MIMO channel) and they monitor (passively and actively emitting random access request) the radio environment. If a better channel is found by a node, said node establishes a new dedicated channel and release the old one. This procedure may supersede the today 3GPP handover procedures. It is also suggested that the node decides behaving as a regular 3GPP terminal, when the node estimates that it cannot do better than regular legacy 3GPP connection.

When an intelligent node 20 receives data to forward to global internet, it tries to do so as if it is its own local user data. Hence, the intelligent node 20 may simply forward it to its global internet connection (as present eNB) or look for another intelligent node 20 to reach closer to a global internet connection.

Moreover, an intelligent node 20 is empowered to serve as a content cache (for example storing firmware updates for cars) and then provide these contents without connection to global internet (FIG. 2). That option is a new feature embedded in a 3GPP/swarmG node. In this case, the message 60 contains whether a data piece request identified by data signature (for example, a SHA-1 signature according to a hash algorithm SHA of the requested data block or a plain internet Uniform Resource Identifier (URI)) and a specific flag to design this request as cache-able, or a http: request. In the http: case the intelligent node 20 is serving the complete query as a web-server. If the cache-able flag is present, a node 20 in the routing chain checks if it already has this data piece in local cache. In this case, it fills directly the answer 62 with the requested data instead of forwarding the request 60. If no intermediate node has this piece of data in its content cache, the request anyway always reaches the intelligent border node. If the request is not a simple URI, this node has the full knowledge of the cached data pieces: it can translate the signature (example SHA-1) into the full internet reference (typically an internet URI) to retrieve the requested data.

The present invention allows enabling statistical cache 24-1, 24-2 of URI data answers in plain data (no cyphering), that is suitable for application that have their own protection (FIG. 2). For example, a software download usually checks itself integrity of the whole binary before activation. The present invention offers to cache regular internet content, in order to empower to cache more content. The URI doesn't specify version of a content (the same URI may provide different answers) and this invention protects end-user data by cyphering. So, the intelligent nodes 20 can implement also cyphered content cache data blocks. These blocks are identified by unique numbers (or transfinite numbers). The content is initially cyphered with a group key by a border node 31, represented in FIG. 3. The node which serves the user with the query (end node 10 or intelligent node 20) must ask for permission and retrieve from the intelligent border node 31 these keys to un-cypher the related blocks, as will be explained later. The intermediate node 20-1, 20-2 can store the content into its cache 24-1, 24-2 without un-cyphering as the intermediate node 20-1, 20-2 does only store and forward. By these means, the intelligent nodes 20 supersedes the content delivery network or content distribution network (CDN) features: each intermediate node 20 can serve directly content answer, the operator can manage user groups through cyphering keys.

A system may comprise a central database 32, as best seen on FIG. 3. As will be explained later regarding FIG. 4, the central database may a near real time central database to which the intelligent nodes report their current status and/or any activity or traffic. The update interval for the elements can be dynamically configured. So e.g. in dense urban environments typically there is a faster refresh required than in rural areas.

Figure 4:
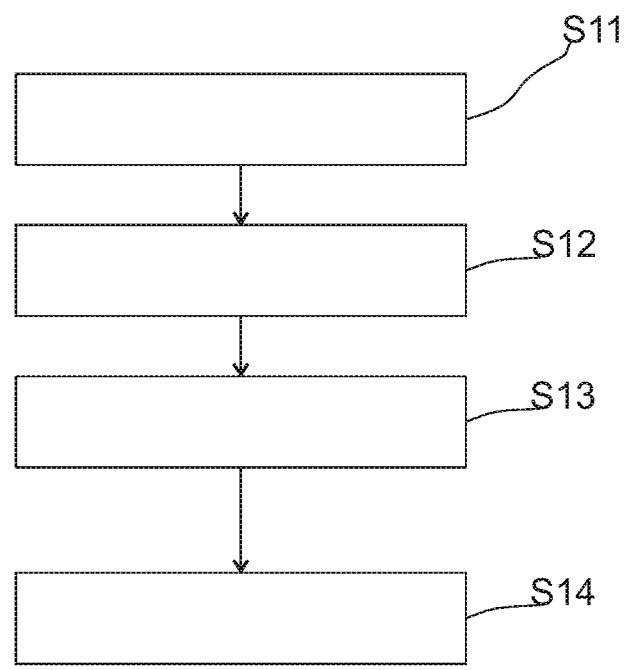
FIG. 4 shows a method of expanding a telecommunications network in one aspect of the invention.

One example of a method of extending an existing telecommunications network will be described with reference to FIG. 4, in the context of cars serving as intelligent nodes operating similarly to the intelligent nodes described with reference to FIGS. 1-3.

The present invention proposes offering a flexible service coverage and throughput on demand in any regions. This may be optimized further by providing an application to the car drivers which can tell them where to park their cars serving as relays, i.e. as intelligent nodes.

To achieve the optimisation, the operator maintain a near real time central database 32. The nodes 20 reports to the central database 32 the traffic they carried for charging and legal traffic interception, but also to update the central database 32. The operator stores the network fixed emitters and so, a near real time image of the network, the moving nodes and the traffic demand. A flag is computed in the real-time central database 32 which indicates if a car, able to work as node, is in a parking position or moving (step S11). If the car is parked, the current available capacity of the car's battery is stored, together with an expected time it could serve as radio relay with a given RF transmission power. The RF transmission power (and band) can be dynamically adjusted depending on the required characteristic of the service (bandwidth optimized, optimized for size of covered area, optimized for maximum RF transmission time) (step S12). If the network can't carry the traffic demand or if it soon will not be able to carry the traffic demand (e.g. current battery capacity declines below a certain value), the central database 32 detects the situation from internal computing of the incoming traffic reports: the nodes reports growing user packets waiting queues, or it reports weak signal quality (power or interferences limitations (S13)). In these cases, a request is sent to other cars to park in that area and take over the service from the car with the low battery capacity to assure a continuous service (step S14).

Figure 5:
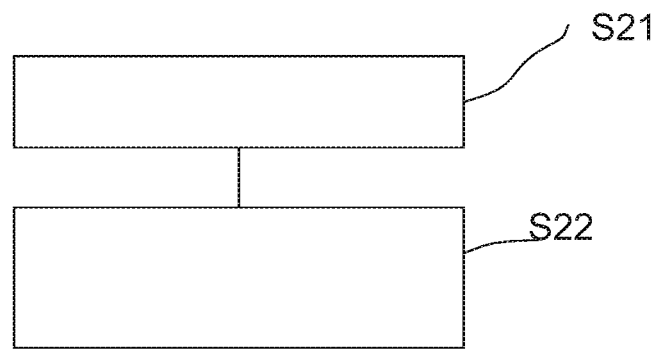
FIG. 5 shows a method of in yet another aspect of the present invention.

Ideal parking positions are determined with an automatic method described with reference to FIG. 5. First, service areas with very high coverage and/or bandwidth demands in the operator network are identified with predictive near real time computation (step S21). Then the car drivers will be dynamically incentivized to park their cars in such high demand areas (step S22). Therefore, operators gain the possibility to automatically react in near real time to increased service coverage and capacity demands by providing an immediate solution.

Figure 6:
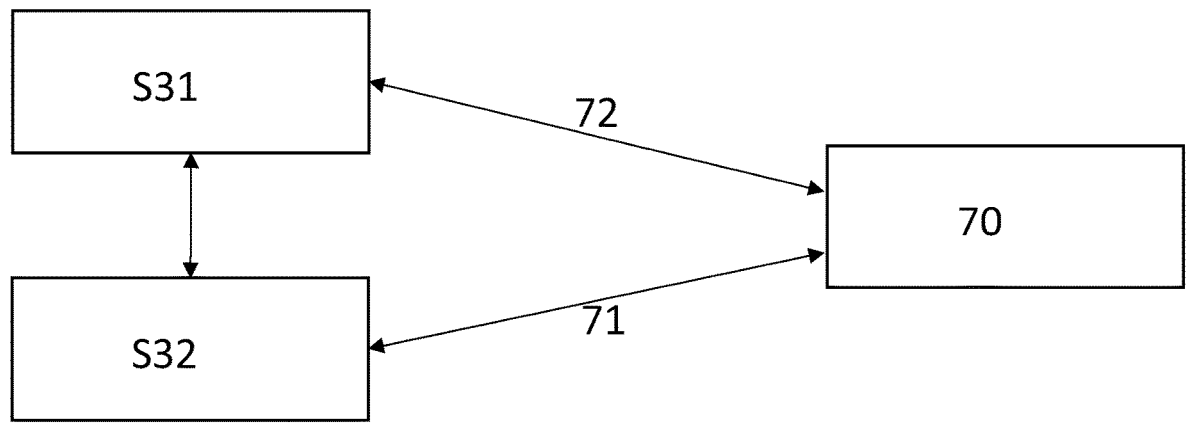
FIG. 6 shows a method of in yet another aspect of the present invention.

Another method consists in determining ideal parking positions on demand which is described with reference to FIG. 6. In this method, a software-based network capacity exchange platform 70 is provided where operators (clients) request on a certain area that a certain radio capacity and/or coverage increase (71, 72). The prices for these services are automatically calculated within the exchange platform 70 based on capacity/coverage demand and supply per area (step S31). Therefore, it is possible for the operator to reduce his fixed network overhead cost and replace it with a "pay as you use" model based on market prices, by sending to selected nodes within the incentive offer (step S32).

It must be understood that the intelligent nodes 20 can obtain the local map from the central operator server and use the map to try random access messages 60 toward the best intelligent nodes as per above described access method.

The intelligent nodes 20 can reduce their probability to be selected as relay from their internal constrains such as the battery load level (see above random access answer).

As it collects knowledge from the mobile positions and links quality, the operator can also send incentives to move intelligent nodes in a critical area by sending application messages to users within a commercial incentive.

Security Management

End user data is cyphered in a similar way as the legacy 3GPP: end users have secret keys in a secure element (called SIM card or UICC today), this secure element can be either separated (regular UICC/SIM card) or integrated in the equipment (as for example the eUICC standard developed by GSM association (GSMA)).

However, in the present invention, the system separates signalling data and end user data cryptography using different keys in the secure element instead of several key derivations from one master key (3GPP Ki key), as seen on FIG. 3 (K2-1, K 3-1 in node 20-1).

Femto BS is known, which is an operator controlled BS that provide service to regular customers, but each customer can place this equipment wherever he wants. Such femto BS needs cyphering keys from the network as any regular BS, the femto BS use it to decipher the user data, then cypher again with another cyphering algorithm to reach the operator core network.

Contrarily to the femto BS, the intelligent nodes of the present invention don't have the keys to decode the cyphered end user data before going to internet edge in an operator secured equipment. Hence, no system security breach can occur as it is the case in today's 3GPP femto BS.

In an aspect of the present invention, the intelligent nodes 20 have also network keys, for example node 20-1 has network key: K2-1. The network keys are used to prove that the intelligent node 20 belongs to the home network. The intelligent node 20 has a node ID unique key to prove itself identity to the other network elements (K2-1). Each node can verify other node identity by similar mechanism as the today UE proves its identity to the legacy eNB (K1-1). The intelligent node secure elements contain several keys to isolate the different cyphering use cases. So, each packet can be verified as belonging to the same network and the signalling data is protected (the network addresses) therefore it can be routed/forwarded. The end-user data is cyphered with different keys, so the intermediate nodes can't access the content.

This is a more secure solution than the known standard 3GPP solution, in which the 3GPP intelligent nodes don't have a secure element neither secret keys: the phones rely on EMEI and an anti-thief historical architecture that never worked properly (the EIR node), the other 3GPP nodes don't have any secure element defined.

Security Keys Management eUICC (http://www.gsma.com/connectedliving/wp-content/uploads/2012/03/SGP-02-v3-0.pdp offers a standard to remotely update subscription in UICC/SIM card. eUICC have been originally defined for machine to machine dedicated 3GPP UE. With eUICC, an embedded node (in a car for example) can change its subscription from one operator to another one by over-the-air UICC update.

eUICC added one master key to be able to update the subscription key over-the-air.

In the present invention, the intelligent nodes 20 create more keys to separate user data cyphering from signalling and node identification, nevertheless the operator can manage them with similar concepts. In addition, to provide a fall-back mechanism that lacks in eUICC standard, spare secret keys are provisioned to be able to create new eUICC masters (eUICC SM-SR node), and to be able to recover a defective eUICC master or to create new use case dedicated cyphering mechanisms without having to transmit over-the-air new keys.

End User Data Cyphering

To re-use the existing standards, the Intelligent node 20 connected to a legacy base station and acts as an end user equipment to reach the core network. The intelligent node 20 identifies itself with regular SIM procedure to the legacy eNB, nevertheless its credentials allow a specific access point name (APN) for this invention. So, the legacy network can tunnel all the data to the APN end point, which is an intelligent border node 31 for the nodes 20.

The Intelligent node 20 can't decipher data but it verifies that the data is signed with the operator credential (example: to avoid flooding attacks). The border node 31 comprises a SwarmG intelligent border controller 35 (FIG. 3) which can (de)cypher each end user data with appropriate keys, so it identifies, authorize the data and forward it. The end user keys are SwarmG specific credentials, or, for legacy end user nodes data, by a S6a interface to the legacy network HSS 33.

For application data, the intelligent border controller implements routing features (36). From internet point of view, function 36 behave like 3GPP PDG functions: it offers a fixed IP address for this intelligent node to the internet. It implements intelligent node specific features. The intelligent node specific features are: routing and cyphering all customer data to be able to get through all use cases: several intelligent 20 nodes relaying data toward final end-point, roaming in another operator network, use unsecure transmission links (example: free WiFi hotspots) to the customer.

The intelligent border node 31 implements also the authentication that is today in the 3GPP MME. The intelligent border node cypher/decipher end user data: plain data come in/out global internet, the border node cypher/decipher with a mechanism that is known only by the subscriber node. The intelligent border node implement mobility management not like 3GPP handovers as this notion of handover is not existing by itself in the present invention. "Mobility" is now a packet by packet routing decision between intelligent nodes to optimize the data path.

Intelligent nodes 20 can serve directly locally connected applications (it is an end user terminal) or act as legacy standards node such as WiFi STA, 3GPP legacy BS and for legacy UE. For those intelligent nodes, it can emit/receive backward compatible RF signals.

Figure 7:
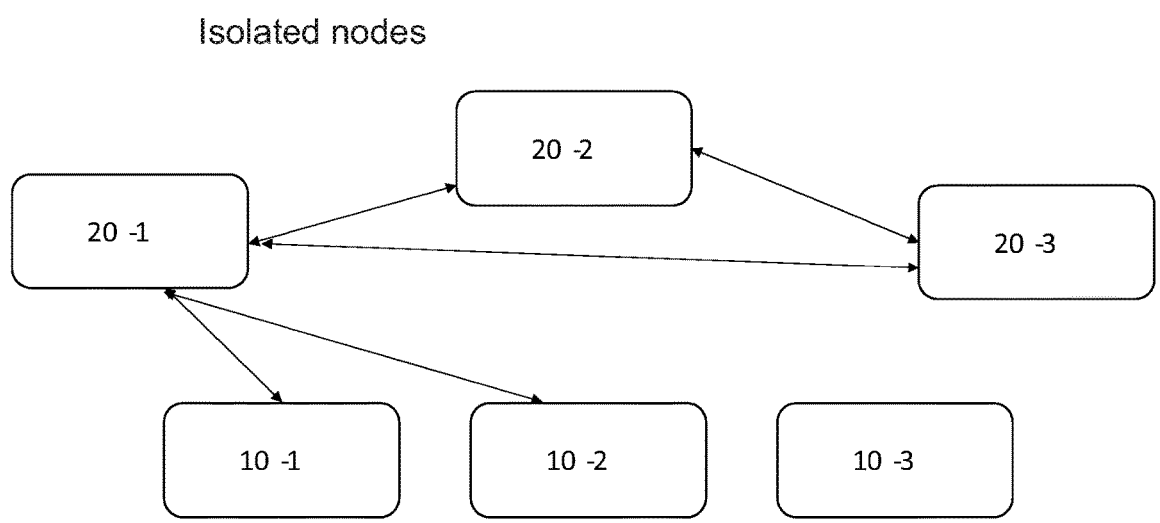
FIG. 7 shows an isolated intelligent node in yet another aspect of the present invention.

Isolated Nodes Case (FIG. 7)

The intelligent node 20 is supposed to reach the operator core network, nevertheless it can operate in isolated mode when the network is not available. The hereafter solution can also be used to transmit data over another operator network for emergency data exchange.

Device to device direct communication doesn't involve the operator network, so the user data can't be deciphered in the operator network to be re-cyphered with the keys of the second user. Furthermore, the operator needs (when communication to global internet become available again) to be informed of the quantity of the licensed frequency band have been used for this transmission in isolated mode. Therefore, such direct communication would require to be signed by the UICC with an internal secret and will be able to verify the identity of each node 20 involved.

In an aspect of the present invention, intelligent nodes 20 that enter in communication declare each other their public unique ID, similarly to IMSI or global cell ID of present 3GPP standard. As the receiver of the communication can't establish any path toward the operator core network, nevertheless it can already verify the network keys. It generates itself a random key, sign it with its secret key and send it to the requester to sign the result with its own secret key and establish a common shared secret for the communication without discovering to the other The resource usage is reported to the operator when a communication to the core network will become again possible. For this reporting, OMA-DM, 3GPP SIM tool kit API, or terminal operating system locked operator applications may be used.

The intelligent node 20 routes packets internally directly on node (or terminal) unique id (IMSI based).

In summary, the present invention proposes a communication network or system that replaces the fixed 3GPP standards resources organization by a real-time on demand resources allocation.

The invention claimed is:

1. A 3GPP telecommunications network comprising:
   a plurality of legacy base stations;
   a plurality of end user equipment;
   at least one intelligent node; and
   a border node, the border node comprising a central database adapted to process historical data to create a map of resources that appear permanently or periodically;
   wherein the intelligent node is adapted to connect to one of the legacy base stations and act as an end user equipment, and
   wherein the intelligent node is adapted to act as a relay or base station to expand said telecommunication network;
   wherein the border node is adapted to act as a fixed internet user for each user of the said communication system, wherein the border node is adapted to authorize and protect data packets to each subscriber of the said telecommunication network.

2. The 3GPP telecommunications network of claim 1, wherein the intelligent node is adapted to emit a first beacon corresponding to a regular 3GPP beacon when said intelligent node needs to offer connectivity to an end user equipment, and wherein the intelligent node is further adapted to emit a second beacon for empowered nodes.

3. The 3GPP telecommunications network of claim 2, wherein the second beacon is a short and discontinuous emission, wherein the second beacon emission pattern is a known pseudo random scheme, enabling listeners to forecast when the next emission is taking place, in particular the pseudo random scheme deriving from a root number for the intelligent node.

4. The 3GPP telecommunications network of claim 2, wherein the second beacon comprises a version number as an adapted signature, in particular increasing at each update, in particular wherein the second beacon does not contain all the system information block of 3GPP standard.

5. The 3GPP telecommunications network of claim 2, wherein the intelligent node is adapted to emit the second beacon when the intelligent node cannot listen another intelligent node speaking node at the same time.

6. The 3GPP telecommunications network of claim 2, wherein the intelligent node is adapted to emit a blind connection request, to either a set of nodes or simply to everybody that can listen said connection request regardless of previous reception of the second beacon.

7. The 3GPP telecommunications network of claim 2, wherein the intelligent node is adapted to decode a further second beacon emitted by a further second intelligent node, in order to find out a global unique number of the further second intelligent node, and wherein the intelligent node has a memory to store node number of other intelligent nodes and maintains a fuzzy neighbour node map as routing information, in particular the intelligent node is adapted to estimate at least one of real-time location, time, antennas in one node, frequencies using said map.

8. The 3GPP telecommunications network of claim 2, wherein the intelligent node is adapted to establish an access packet to request communication regardless of observed second beacons.

9. The 3GPP telecommunications network claim 1, wherein the intelligent node is adapted to use frequency channels, in particular two sub frequency channels of a FDD scheme or two time-slots of uplink and downlink of a TDD scheme, regardless of the fixed FDD or TDD scheme or any other fixed permanent organisation.

10. The 3GPP telecommunications network of claim 1, wherein the intelligent node has a network key to prove that the intelligent node belongs to a home network identified by the network key, wherein the intelligent node is adapted to separate signalling data and end user data cryptography using different security keys.

11. The 3GPP telecommunications network according to claim 1, wherein the telecommunication network is adapted to establish a multi hop routing of data based on routing information collected by second beacons and access requests answers.

12. The 3GPP telecommunications network according to claim 1, comprising at least one network key for the intelligent node, the network key being a node ID unique key to prove said intelligent node's identity to other network elements.

13. The 3GPP telecommunications network according to claim 1, comprising a border node, wherein the border node is adapted to act as a fixed internet user for each user of the said communication system, wherein the border node is adapted to authorize and protect data packets to each subscriber of the said telecommunication network.

14. The 3GPP telecommunications network according to claim 1, the central database providing information to further intelligent nodes belonging to said telecommunication network to improve the probability of success of each transmission and minimize interferences to legacy communication networks that share the same frequency bands.

15. The 3GPP telecommunication network of claim 1, comprising an automatic computation of network coverage gaps, wherein the automatic computation of network coverage gaps is adapted to send incentives to customers to place their intelligent nodes where it fills these gaps.

* * * * *